(12) United States Patent
Okuno

(10) Patent No.: US 11,221,808 B2
(45) Date of Patent: Jan. 11, 2022

(54) IMAGE FORMING APPARATUS CAPABLE OF NETWORK AND NON-NETWORK CONNECTION

(71) Applicant: BROTHER KOGYO KABUSHIKI KAISHA, Nagoya (JP)

(72) Inventor: Tetsuya Okuno, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/830,383

(22) Filed: Mar. 26, 2020

(65) Prior Publication Data

US 2020/0310715 A1   Oct. 1, 2020

(51) Int. Cl.
*G06F 3/12* (2006.01)

(52) U.S. Cl.
CPC .......... *G06F 3/1238* (2013.01); *G06F 3/1222* (2013.01); *G06F 3/1285* (2013.01)

(58) Field of Classification Search
None
See application file for complete search history.

(56) References Cited

U.S. PATENT DOCUMENTS

| | | | |
|---|---|---|---|
| 2013/2001519 | | 8/2013 | Duyk et al. |
| 2014/0129674 A1* | | 5/2014 | Matsuda ................. H04L 67/12 709/217 |
| 2014/0146364 A1 | | 5/2014 | Matsumoto |
| 2016/0255062 A1 | | 9/2016 | Perez |
| 2017/0277497 A1* | | 9/2017 | Iwauchi ................ G06F 3/1205 |

FOREIGN PATENT DOCUMENTS

| | | |
|---|---|---|
| JP | 2014-106581 A | 6/2014 |
| JP | 2015-507291 A | 3/2015 |
| JP | 2016-162445 A | 9/2016 |

\* cited by examiner

*Primary Examiner* — Thomas D Lee
(74) *Attorney, Agent, or Firm* — Scully, Scott, Murphy & Presser, PC

(57) ABSTRACT

An image forming apparatus configured to execute: either of: encryption determination processing of determining whether a connection request is encrypted, in a case where the connection request has been transmitted via a network driver; and non-network receipt processing of operating a recording driver based on the connection request without determining whether the connection request is encrypted, in a case where the connection request has been transmitted via a non-network driver; and in a case where the encryption determination processing is executed, either of: decryption processing of decrypting the connection request which is encrypted and network receipt processing of operating the recording driver based on the decrypted connection request, in a case where the connection request is encrypted; and rejection processing of not operating the recording driver based on the connection request, in a case where the connection request is not encrypted.

7 Claims, 4 Drawing Sheets

IMAGE FORMING APPARATUS CAPABLE OF NETWORK AND NON-NETWORK CONNECTION

CROSS-REFERENCE TO RELATED APPLICATIONS

This application is based upon and claims the benefit of priority from prior Japanese patent application No. 2019-065745, filed on Mar. 29, 2019, the entire contents of which are incorporated herein by reference.

TECHNICAL FIELD

The present disclosure relates to an image forming apparatus capable of network connection and non-network connection.

BACKGROUND ART

There is known a multifunction peripheral (MFP) that, in a case where contents data included in USB data packets received from a personal computer (PC) via a universal serial bus (USB) includes a hypertext transfer protocol (HTTP) command, causes a Web server to process the contents data, and in a case where the HTTP command is not included, causes a printing engine to process the contents data. Also, there is known a technology of providing a computer with a bridge between a non-network interface such as a USB interface and a network interface so as to be able to use a printer connected to the computer via the non-network interface from a portable electronic device. Also there is known an Internet printing protocol (IPP)-USB technology for performing printing according to IPP standards when a printer and a computer are USB-connected to each other.

In recent years, for security enhancement, communication between an image forming apparatus and a terminal device network such as a computer connected to the image forming apparatus via a local area network (LAN) port or wireless LAN (WLAN) is generally encrypted using technology such as secure socket layer (SSL). In this case, a connection request of an HTTP format transmitted from the terminal device to the image forming apparatus via the network is checked in an embedded Web server (EWS) configured to process a request of an HTTP format as to whether the request is encrypted. The Web server rejects an unencrypted (i.e., "plain text") connection request, and decrypts only the encrypted request to execute the request.

The terminal device may also be USB-connected to the image forming apparatus via a cable as well as the network connection. Therefore, the image forming apparatus preferably has a LAN driver with which network connection is made and a USB driver with which USB connection is made so that both connections can be made. However, communication from the terminal device to the image forming apparatus via the USB cannot be encrypted due to limits of USB communication. For this reason, as described above, in a case where the Web server can execute only an encrypted connection request, a connection request supplied from the terminal device to the Web server via the USB will be rejected. To the contrary, in a case where the Web server can execute a connection request via the USB, sufficient security cannot be ensured.

SUMMARY

An aspect of the present disclosure provides an image forming apparatus capable of appropriately executing both an encrypted connection request transmitted from a terminal device via network and an unencrypted connection request transmitted from a terminal device via USB while ensuring sufficient security.

According to an aspect of the present disclosure, there is provided an image forming apparatus including: a recording unit configured to form an image on a recording medium; and a controller including: a recording driver configured to drive the recording unit; a network driver configured to perform communication with a terminal device via a network; a non-network driver configured to perform communication with a terminal device connected to the image forming apparatus in a wired manner, without via the network; and a processing unit configured to receive a connection request of an HTTP format from a terminal device to the recording unit via the network driver or the non-network driver, wherein the processing unit is configured to execute: (a) transmission source determination processing of determining whether the connection request has been transmitted via the network driver or the non-network driver; either of: (b1) encryption determination processing of determining whether the connection request is encrypted, in a case where it is determined in the transmission source determination processing that the connection request has been transmitted via the network driver; and (b2) non-network receipt processing of operating the recording driver based on the connection request without determining whether the connection request is encrypted, in a case where it is determined in the transmission source determination processing that the connection request has been transmitted via the non-network driver; and in a case where the encryption determination processing is executed, either of: (c1) decryption processing of decrypting the connection request which is encrypted and network receipt processing of operating the recording driver based on the decrypted connection request, in a case where it is determined in the encryption determination processing that the connection request is encrypted; and (c2) rejection processing of not operating the recording driver based on the connection request, in a case where it is determined in the encryption determination processing that the connection request is not encrypted.

Since it is possible to execute the always unencrypted connection request from a non-network-connected terminal device while executing only the encrypted connection request from a network-connected terminal device, it is possible to execute both the connection requests while ensuring sufficient security.

DESCRIPTION OF EMBODIMENTS

[Overall Configuration of Apparatus]

Hereinbelow, a printer, which is an image forming apparatus in accordance with a preferable embodiment of the present disclosure, will be described with reference to the drawings.

Figure 1:
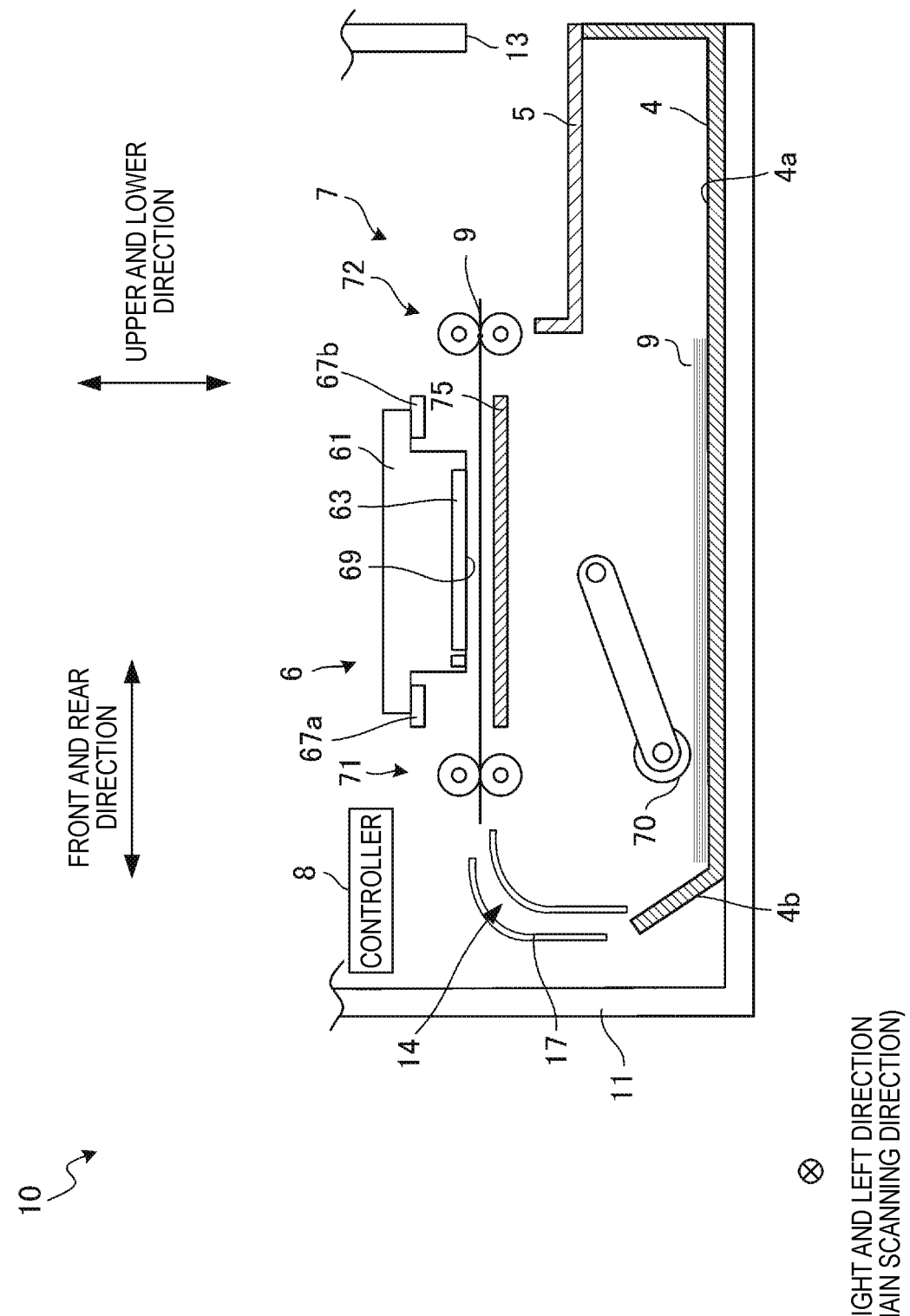
FIG. 1 is a schematic side view depicting an internal structure of a printer as an image forming apparatus in accordance with an embodiment of the present disclosure.

FIG. 1 depicts an internal configuration of a printer 10. In descriptions below, an upper and lower direction is defined on the basis of a state (a state shown in FIG. 1) in which the printer 10 is usably equipped, a front and rear direction is defined on the basis of a side (a front side; a front face) of a housing 11 on which an opening 13 is provided, and a right and left direction is defined when the printer 10 is seen from the front side (front face).

As shown in FIG. 1, the printer 10 includes a sheet feeding tray 4, a discharge tray 5, a print module 6, a conveyor unit 7, and a controller 8. The sheet feeding tray 4, the print module 6, the conveyor unit 7, and the controller 8 are accommodated in the housing 11 of the printer 10. The controller 8 is configured to control the entire printer 10. In the housing 11, the sheet feeding tray 4 is disposed below the print module 6.

The sheet feeding tray 4 can accommodate a plurality of stacked sheets 9 while supporting the same. The sheet feeding tray 4 can be taken in and out from the opening 13 formed in the front face of the housing 11 in the front and rear direction. In the meantime, the discharge tray 5 is disposed above a front side of the sheet feeding tray 4, and is adapted to move together with the sheet feeding tray 4. The sheet feeding tray 4 has a support surface 4a for supporting the sheet 9. The support surface 4a is a surface perpendicular to the upper and lower direction. When the sheet feeding tray 4 is positioned in the housing 11, the support surface 4a is exposed to an internal space of the housing 11. A rear end portion of the sheet feeding tray 4 is provided with a tilted plate 4b.

The print module 6 includes a carriage 61 and a recording head 63. The carriage 61 is supported by two guide rails 67a and 67b. The two guide rails 67a and 67b are disposed with being spaced in the front and rear direction, and extend in the right and left direction, respectively. The carriage 61 is disposed to extend over the two guide rails 67a and 67b. The carriage 61 is configured to reciprocally move in the right and left direction, which is a main scanning direction, along the two guide rails 67a and 67b by a carriage drive motor 21 (refer to FIG. 2). The recording head 63 is mounted on the carriage 61. The recording head 63 is configured to discharge ink, which is supplied from an ink cartridge (not shown), from a plurality of nozzles (not shown) provided in a nozzle surface 69 of a lower surface.

The conveyor unit 7 is provided so as to convey the sheet 9 in the print module 6, and includes a feeder roller 70, a pair of conveyor rollers 71, a pair of discharge rollers 72, a platen 75, and a guide member 17. The feeder roller 70 is configured to send rearward the uppermost sheet 9 of the sheets supported on the sheet feeding tray 4 as it is rotated by drive force applied from a feeder motor 22 (refer to FIG. 2).

The pair of conveyor rollers 71 and the pair of discharge rollers 72 are disposed with the print module 6 provided therebetween in the front and rear direction, and the pair of conveyor rollers 71 is disposed at the rear of the print module 6 and the pair of discharge rollers 72 is disposed in front of the print module 6. The platen 75 is disposed to face the nozzle surface 69 of the print module 6 below the print module 6. The pair of conveyor rollers 71 and the pair of discharge rollers 72 are configured to drive by drive force applied from a conveyor motor 23 (refer to FIG. 2).

The guide member 17 defines a conveying path 14 along which the sheet 9 delivered from the sheet feeding tray 4 is to be sent toward a region facing the nozzle surface 69 of the recording head 63. The guide member 17 extends from the vicinity of a rear end portion of the sheet feeding tray 4 to the vicinity of the pair of conveyor rollers 71.

The sheet 9 delivered rearward from the sheet feeding tray 4 by the feeder roller 70 is caused to face obliquely upward by the tilted plate 4b provided to the rear end portion of the sheet feeding tray 4, passes through the conveying path 14 defined by the guide member 17, and then reaches a position in which the sheet is sandwiched by the pair of conveyor rollers 71. The sheet 9 sandwiched by the pair of conveyor rollers 71 is conveyed toward a region facing the nozzle surface 69 of the recording head 63 by the pair of conveyor rollers 71. The sheet 9 conveyed by the pair of conveyor rollers 71 is discharged thereon with the ink from the nozzles (not shown) of the recording head 63 moving in the main scanning direction, in a state in which the sheet is supported by the platen 75, so that an image is recorded thereon. The recorded sheet 9 is conveyed forward by the pair of discharge rollers 72 and is then discharged onto the discharge tray 5.

[Block Configuration]

Figure 2:
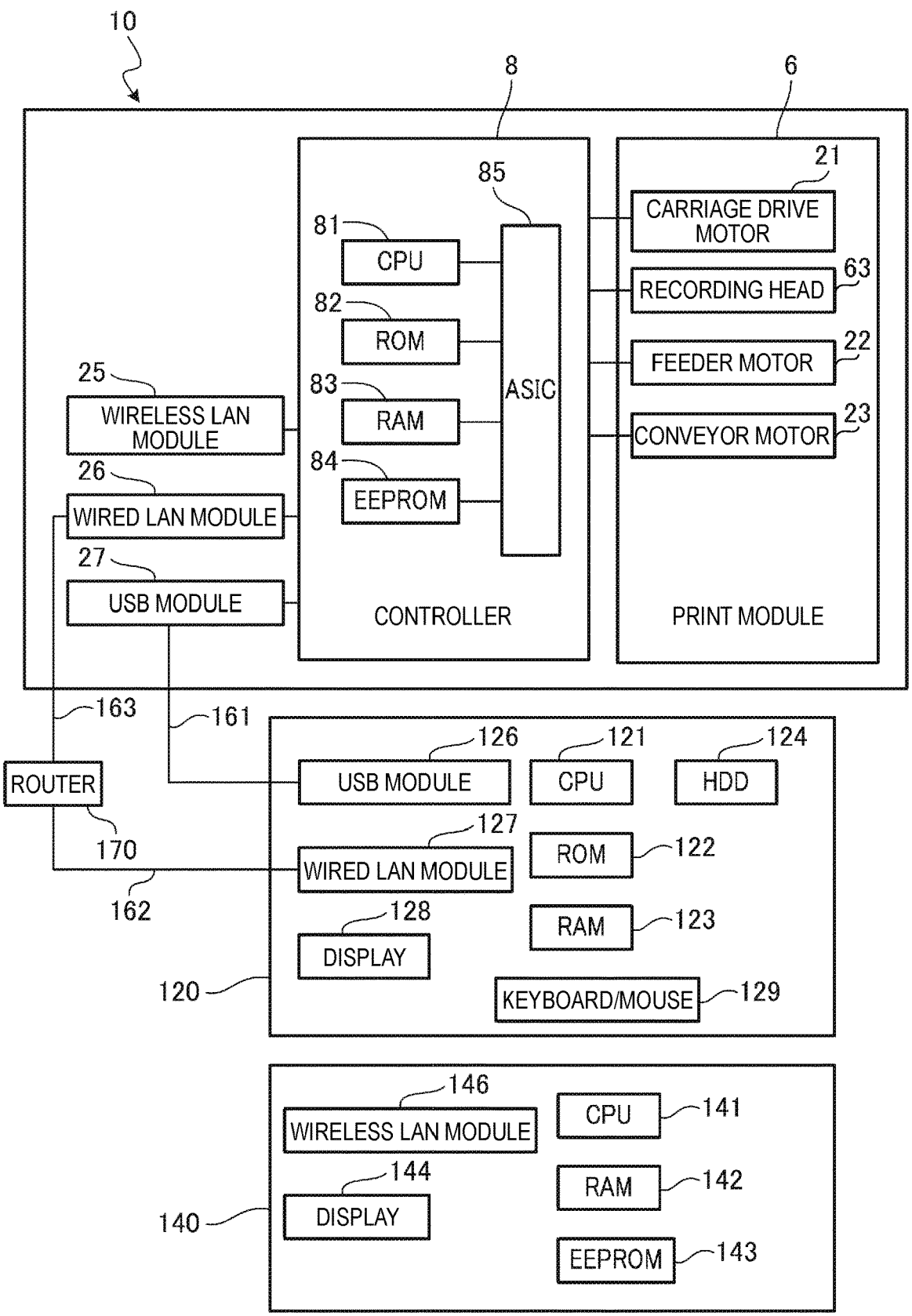
FIG. 2 is a block diagram depicting hardware configurations of the printer shown in FIG. 1 and a computer and a portable terminal connected to the printer.

Subsequently, a block configuration of the printer 10 in accordance with the present embodiment is described with reference to FIG. 2. As shown in FIG. 2, the controller 8 of the printer 10 is electrically connected with the carriage drive motor 21, the recording head 63, the feeder motor 22 and the conveyor motor 23 of the printer 10. Also, the controller 8 is electrically connected with a wireless LAN module 25, a wired LAN module 26 and a USB module 27.

The wireless LAN module 25 is configured to perform network communication with a separate wireless communication device (a portable terminal 140, in the present embodiment), based on wireless LAN communication standards such as IEEE 802.11ac. The wired LAN module 26 has a LAN port, which is an insertion port of a LAN cable 163, and is configured to perform network communication with a separate communication device (a PC 120, in the present embodiment) connected via a router 170, based on wired LAN communication standards such as Ethernet (registered trademark). The USB module 27 has a USB port, which is an insertion port of a USB cable 161, and is configured to perform USB communication (non-network communication) with a separate communication device (a PC 120, in the present embodiment) to which the USB cable 161 is connected, based on USB standards. Therefore, the printer 10 can perform data communication with any device via any one of the modules 25, 26 and 27, based on the communication standards.

As shown in FIG. 2, the controller 8 includes a CPU (Central Processing Unit) 81, a ROM (Read Only Memory) 82, a RAM (Random Access Memory) 83, an EEPROM (Electrically Erasable Programmable Read-Only Memory) 84, and an ASIC (Application Specific Integrated Circuit) 85, which cooperate to control operations of the print module 6, the wireless LAN module 25, the wired LAN module 26 and the USB module 27.

The controller 8 is configured to execute an image recording operation of recording, on the sheet 9, an image relating to image data input from the PC 120 or the portable terminal 140. In the meantime, in the image recording operation, the controller 8 is configured to control the carriage drive motor 21 so that the carriage 61 is to reciprocally move in the main scanning direction. Also, the controller 8 is configured to control the recording head 63 so that the ink is to be discharged from the nozzles (not shown) of the recording head 6, based on the image data stored in the RAM 83. Also, the controller 8 is configured to control the feeder motor 22 and the conveyor motor 23 so that the sheet 9 accommodated on the sheet feeding tray 4 is to be discharged onto the sheet discharge tray 5 through a position facing the recording head 63.

Meanwhile, in FIG. 2, one CPU 81 and one ASIC 85 are shown. However, the controller 8 may include only one CPU 81 and the one CPU 81 may be configured to collectively execute necessary processing, or may include a plurality of CPUs 81 and the plurality of CPUs 81 may be configured to share necessary processing. Also, the controller 8 may include only one ASIC 85 and the one ASIC 85 may be configured to collectively execute necessary processing, or may include a plurality of ASICs 85 and the plurality of ASICs 85 may be configured to share necessary processing.

The PC 120 includes a CPU 121, a ROM 122, a RAM 123 and an HDD (Hard Disk Drive) 124. In the HDD 124, a printer management program configured to control operations of the printer 10 and the like are installed, in addition to an OS (Operation System) configured to control operations of the PC 120. Also, the PC 120 includes a display 128, and an input device 129 such as a keyboard, a mouse and the like that are to be operated by a user. The CPU 121 can control the operations of the printer 10 by executing the printer management program. As described later, in the present embodiment, a Web screen received from the printer 10 is displayed on the display 128.

The PC 120 further includes a USB module 126 and a wired LAN module 127. In the present embodiment, the USB module 126 is connected to the USB module 27 of the printer 10 via the USB cable 161. The wired LAN module 127 is connected to the router 170 via the LAN cable 162. The router 170 may or may not be connected to the Internet. Also, in a case where the router 170 includes a wireless LAN module, the router 170 may be wirelessly connected to the wireless LAN module 25.

The portable terminal 140 such as a smart phone, a tablet PC or the like includes a CPU 141, a RAM 142, and an EEPROM 143. In the EEPROM 143, a printer management program configured to control operations of the printer 10 and the like are installed, in addition to an OS configured to control operations of the portable terminal 140. Also, the portable terminal 140 includes a touch panel-type display 144, which is an input/output device. The Web screen received from the printer 10 is displayed on the display 144.

The portable terminal 140 further includes a wireless LAN module 146. In the present embodiment, the wireless LAN module 146 is directly wirelessly connected to the wireless LAN module 25 of the printer 10 (ad hook mode). Here, in a case where the router 170 includes a wireless LAN module, the wireless LAN module 146 may be wirelessly connected to the printer 10 via the router 170 (infrastructure mode).

[Configuration of Software]

Figure 3:
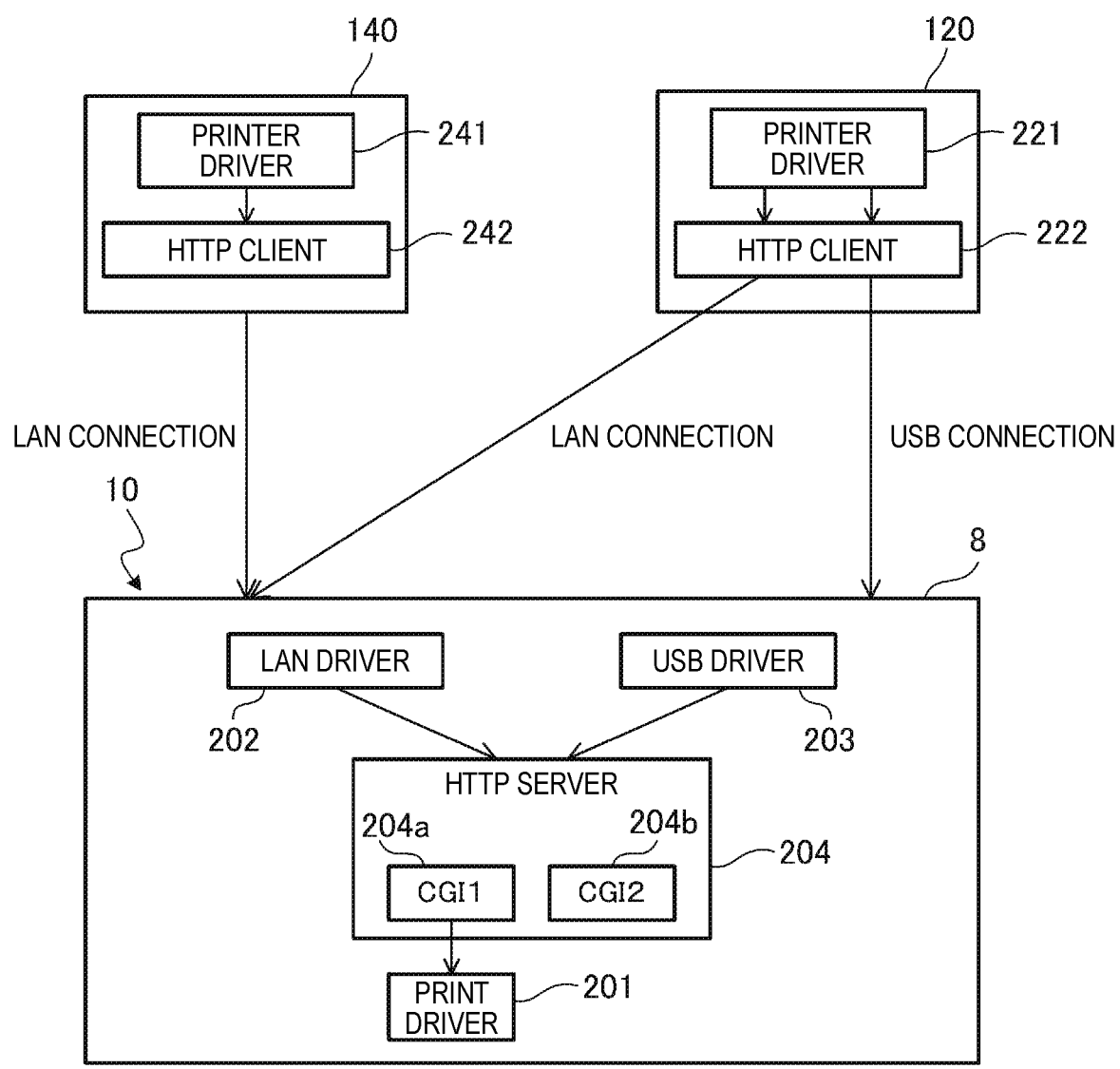
FIG. 3 is a block diagram showing FIG. 2 as a software configuration of a connection request from the computer and the portable terminal to the printer.

Subsequently, a configuration of software relating to a connection request from the PC 120 and the portable terminal 140 to the printer 10 is described with reference to FIG. 3. In the present embodiment, the PC 120 includes a printer driver 221 and an HTTP client 222, and the portable terminal 140 includes a printer driver 241 and an HTTP client 242. The printer driver 221 and the printer driver 241 are respectively configured to generate a print command (including printing setting data such as a number of prints and an image quality, in addition to the image data) to the printer 10 and a display command of a Web screen embedded in the printer 10, based on a user's input operation. The HTTP client 222 and the HTTP client 242 are Web clients corresponding to an encryption protocol such as SSL, and are configured to output the print commands and display commands generated by the printer driver 221 and printer driver 241 to the printer 10, which is a destination, as connection requests of an HTTP format.

In a case where the HTTP client 222 of the PC 120 outputs a connection request via the USB module 126, the HTTP client 222 outputs the connection request, as a plain text, without encrypting the same. That is, a URL (Uniform Resource Locator) of the connection request output from the USB module 126 is "http://localhost/print", for example, in the case of the print command, and is "http://localhost/index", for example, in the case of the display command.

In a case where the HTTP client 222 of the PC 120 outputs a connection request via the wired LAN module 127, in a case where the connection request is the print command, the HTTP client 222 encrypts the connection request, and in a case where the connection request is the display command, the HTTP client 222 outputs the connection request, as a plain text, without encrypting the same. That is, a URL of the connection request output from the wired LAN module 127 is "https://example/print", for example, in the case of the print command, and is "http://example/index", for example, in the case of the display command. In the meantime, this also applies to a case where the HTTP client 222 outputs a connection request via the wireless LAN module.

Also, in a case where a connection request output via the wireless LAN module 146 is the print command, the HTTP client 242 of the portable terminal 140 encrypts the same, and in a case where the connection request is the display command, the HTTP client 242 outputs the connection request, as a plain text, without encrypting the same. That is, a URL of the connection request output from the wireless LAN module 146 is "https://example/print", for example, in the case of the print command, and is "http://example/index", for example, in the case of the display command.

The controller 8 of the printer 10 includes a print driver 201, a LAN driver 202, a USB driver 203, which is a non-network driver, and a Web server 204 as a processing unit corresponding to the encryption protocol such as SSL. The print driver 201 is configured to drive the print module 6, based on a printing request received from the Web server 204. The LAN driver 202 is configured to perform communication with the PC 120 and the portable terminal 140 via the network. The USB driver 203 is configured to perform communication with the PC 120 connected to the printer 10 via the USB cable 161, without via the network.

The connection request transmitted from the PC 120 is received by the USB driver 203 when it is transmitted via the USB cable 161, and is received by the LAN driver 202 when it is transmitted via the LAN cable 162, 163. Also, the connection request transmitted from the portable terminal 140 is received by the LAN driver 202. In the present embodiment, when the connection request is received from the PC 120 or the portable terminal 140, the LAN driver 202 sets a flag stored in the Web server 204, which indicates that the LAN driver 202 has received the connection request, to ON. Therefore, even when the USB driver 203 receives the connection request from the PC 120, the flag is kept OFF.

The Web server 204 receives the connection request of the HTTP format from the PC 120 and the portable terminal 140 via the LAN driver 202 or the USB driver 203, and executes processing to be described below. In the present embodiment, the Web server 204 has a first CGI (Common Gateway Interface) 204a and a second CGI 204b, which correspond to different URLs. The first CGI 204a is used so as to activate the print driver 201 from the Web server 204. The second CGI 204b is used so as to display, on the display 128 of the PC 120 and the display 144 of the portable terminal 140, a Web screen (for example, a screen for displaying at least one of a setting state of an operation parameter, an operating state of the printer 10, and an estimated remaining amount of ink) stored in the Web server 204.

In the present embodiment, in a case where an end of a URL of a connection request is "/print", the Web server 204 allots the connection request to the first CGI 204a, and in a case where the end of the URL of the connection request is "/index", the Web server 204 allots the connection request to the second CGI 204b.

The first CGI 204a is configured to reject the connection request or to receive the connection request to activate the print driver 201, depending on whether the allotted connection request is received via the USB or the LAN, and whether the connection request is encrypted in a case where the allotted connection request is received via the LAN. The second CGI 204b is configured to output data relating to the Web screen stored in the Web server 204, without determining attributes (herein, a transmission path and whether encryption is made or not) of the allotted connection request. The processing that is executed by the first CGI 204a and the second CGI 204b will be described in detail later.

[Operations of Printer]

Figure 4:
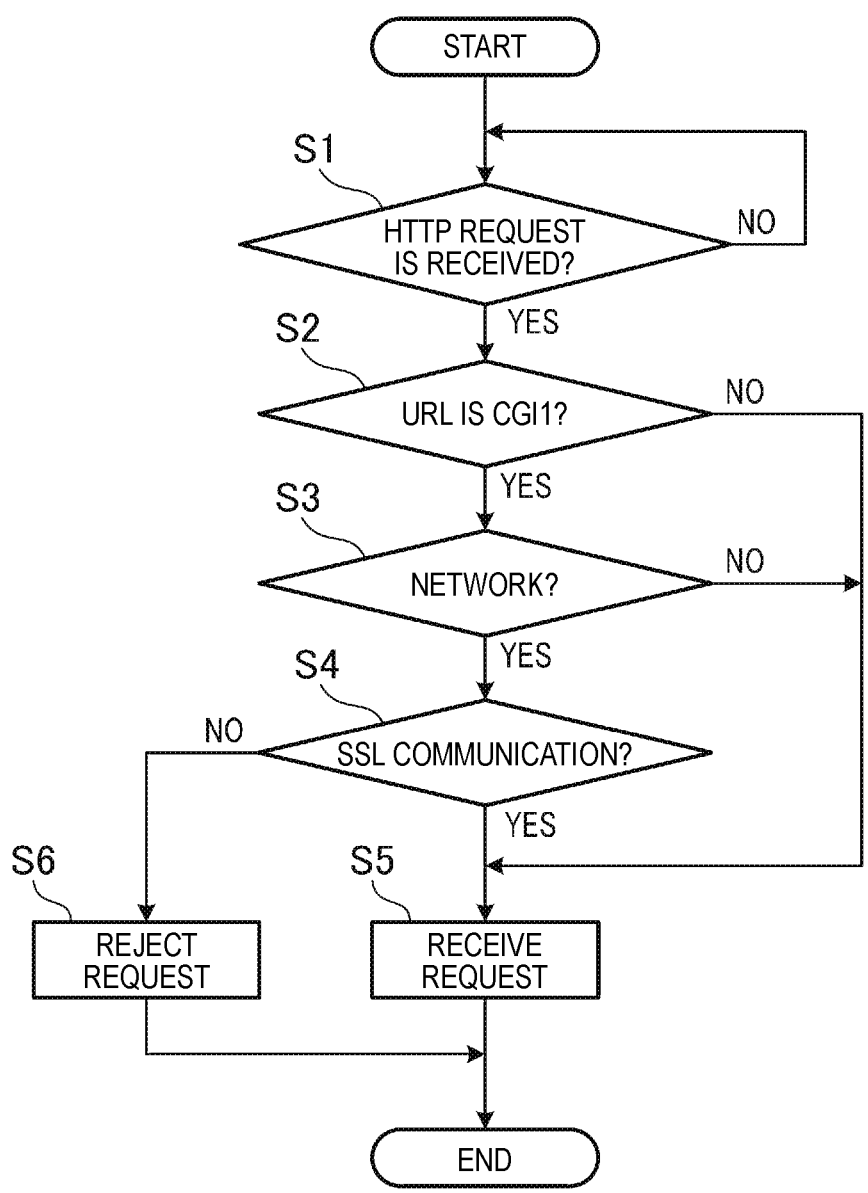
FIG. 4 is a flowchart depicting operations of the printer shown in FIG. 1, which are executed when a connection request is received from the computer and the portable terminal.

Subsequently, operations that are executed when the printer 10 receives the connection request from the PC 120 and the portable terminal 140 are further described with reference to FIG. 4. The operations below are executed by the Web server 204.

First, in S1, the Web server 204 determines whether a connection request of the HTTP format is received. In a case where it is determined that the connection request is received (S1: YES), the Web server 204 determines in S2 whether an end of a URL of the connection request is "/print". In a case where it is determined that the end of the URL is "/print", the Web server 204 allots the connection request to the first CGI 204a (S2: YES), and proceeds to S3. In a case where it is determined that the end of the URL is not "/print", i.e., is "/index", the Web server 204 allots the connection request to the second CGI 204b (S2: NO), and proceeds to S5.

In this case, in S5, the second CGI 204b outputs data relating to the Web screen (for example, including a setting state of an operation parameter, and the like) stored in the Web server 204 without determining the attributes of the allotted connection request. The output Web screen is supplied to the PC 120 or the portable terminal 140 by traveling a path along which the connection request has been received in a reverse direction. Then, the Web screen is displayed on the display 128 or 144 by the HTTP client 222 or the HTTP client 242.

In S3, the first CGI 204a determines whether the received connection request is via the USB or the LAN, based on whether the flag is ON or OFF. That is, in a case where the flag is ON, it is determined that the connection request has been transmitted through the LAN driver 202 via the LAN, and in a case where the flag is OFF, it is determined that the connection request has been transmitted through the USB driver 203 via the USB (transmission source determination processing). In this way, in the present embodiment, since the flag is set to ON when the LAN driver 202 receives the connection request from the PC 120 or the portable terminal 140, the Web server 204 can easily execute the transmission source determination processing. In a case where it is determined that the connection request has been transmitted via the LAN driver 202 (S3: YES), the Web server 204 proceeds to S4. Also, in a case where it is determined that the connection request has been transmitted via the USB driver 203 (S3: NO), the Web server 204 proceeds to S5.

In this case, in S5, the first CGI 204a operates the print driver 201 to drive the print module 6 based on the connection request without determining whether the connection request is encrypted (non-network receipt processing). Thereby, the ink is discharged from the recording head 63, so that an image is formed on the sheet 9.

In S4, the first CGI 204a determines whether the connection request is encrypted (encryption determination processing). Specifically, it is determined whether the connection request is encrypted, based on exchanging an SSL certificate file, checking whether a pre-procedure for encryption has been performed with the PC 120 or the portable terminal 140, and the like. When it is determined that the connection request is encrypted (S4: YES), the Web server 204 proceeds to S5. Also, when it is determined that the connection request is not encrypted (that the connection request is a plain text, S4: NO), the Web server 204 proceeds to S6.

In this case, in S5, the first CGI 204a decrypts the encrypted connection request (decryption processing) and operates the print driver 201 to drive the print module 6, based on the decrypted connection request (network receipt processing). Thereby, the ink is discharged from the recording head 63, so that an image is formed on the sheet 9.

In the meantime, in S6, the print driver 201 is not operated based on the connection request (rejection processing). In this case, the first CGI 204a outputs data relating to a Web screen including a message which indicates that the printing cannot be performed. The output Web screen is supplied to the PC 120 or the portable terminal 140 by traveling the path along which the connection request has been received in the reverse direction. Then, the Web screen is displayed on the display 128 or 144 by the HTTP client 222 or the HTTP client 242.

According to the above embodiment, since it is possible to execute only the encrypted connection request from the PC 120 or portable terminal 140 connected to the LAN while rejecting the unencrypted connection request from the PC 120 or portable terminal 140, and to execute the always unencrypted connection request from the PC 120 connected to the USB which has no risk of eavesdropping and the like, it is possible to execute both the connection requests while ensuring sufficient security.

Also, since the Web server has the first CGI 204a and the second CGI 204b corresponding to the different URLs, it is possible to execute the processing corresponding to the request from the PC 120 or the portable terminal 140.

Modified Embodiments

Subsequently, various modified embodiments of the above embodiment are described.

In the above embodiment, the processing unit is configured by a Web server, and is configured to execute each of the transmission source determination processing, the encryption determination processing, the non-network receipt processing, the decryption processing, the network receipt processing, and the rejection processing. However, the processing unit is not necessarily required to be configured by a Web server. Also, the processing may be shared by a plurality of blocks in the controller 8. For example, the transmission source determination processing may be executed by the Web server 204, and the other processing may be executed by the print driver 201.

Also, in the case where the processing unit is configured by a Web server, only the first CGI may be provided, without the second CGI. Also, the present disclosure includes a configuration in which the processing unit with no CGI can execute the above-described processing.

The non-network driver may be a driver other than the USB driver.

The determination as to whether the connection request is transmitted via the network driver or the non-network driver may be made based on means other than the flag described in the above embodiment.

The encryption protocol may be TLS (Transport Layer Security), other than SSL.

The connection format of the wireless LAN may be Peer to Peer such as Wi-Fi Direct, in addition to Wi-Fi.

In a case where the image forming apparatus is a complex machine having a document reading device, the present disclosure can also be applied to scan (reading) processing of reading a document image to generate image data, and copy processing of forming, on the sheet, the same image as the document read by the reading device.

Also, in the above embodiment, the inkjet-type image forming apparatus in which an image is recorded by the ink discharged from the nozzles has been exemplified. However, the present disclosure can also be applied to an image forming apparatus including a laser-type recording unit, other than the inkjet type, for example.

What is claimed is:

1. An image forming apparatus comprising:
   a controller including:
   a recording driver configured to drive recording of an image on a recording medium;
   a network driver configured to perform communication with a terminal device via a network; and
   a non-network driver configured to perform communication with a terminal device connected to the image forming apparatus in a wired manner, without via the network,
   wherein the controller is configured to receive a connection request of an HTTP format from a terminal device to the image forming apparatus via the network driver or the non-network driver, and
   wherein the controller is configured to execute:
   (a) transmission source determination processing of determining whether the connection request has been transmitted via the network driver or the non-network driver;
   (b1) encryption determination processing of determining whether the connection request is encrypted, in a case where it is determined in the transmission source determination processing that the connection request has been transmitted via the network driver; and
   (b2) non-network receipt processing of operating the recording driver based on the connection request without determining whether the connection request is encrypted, in a case where it is determined in the transmission source determination processing that the connection request has been transmitted via the non-network driver; and
   (c1) rejection processing of not operating the recording driver based on the connection request, in a case where it is determined in the encryption determination processing that the connection request is not encrypted.

2. The image forming apparatus according to claim 1, wherein the non-network driver is a USB driver.

3. The image forming apparatus according to claim 1, wherein when at least one of the network driver and the non-network driver receives the connection request from the terminal device, the at least one of the network driver and the non-network driver stores flag data, which indicates that the at least one of the network driver and the non-network driver has received the connection request, in the controller.

4. The image forming apparatus according to claim 1, wherein, in the encryption determination processing, the controller is configured to determine whether the connection request is encrypted based on SSL standards.

5. The image forming apparatus according to claim 1, wherein the controller is further configured to execute:
   in a case where the encryption determination processing is executed,
   (c2) decryption processing of decrypting the connection request which is encrypted and network receipt processing of operating the recording driver based on the decrypted connection request, in a case where it is determined in the encryption determination processing that the connection request is encrypted.

6. The image forming apparatus according to claim 5, wherein the controller includes a Web server configured to receive the connection request of the HTTP format from the terminal device to the recording device via the network driver or the non-network driver, the Web server including a first CGI and a second CGI corresponding to different URLs, the first CGI being used so as to activate the recording driver from the Web server, and the second CGI being used so as to display on the terminal device a Web screen stored in the image forming apparatus,
wherein the Web server is configured to allot the connection request received from the terminal device via the network driver and the non-network driver to the first CGI or the second CGI, in correspondence to a URL described as a transmission destination of the connection request,
wherein the first CGI is configured to execute the processing (a), then the processing (b1) or (b2), and the processing (c1) or (c2) in a case where the processing (b1) is executed, in response to the allotted connection request, and
wherein the second CGI is configured to output data relating to the Web screen stored in the image forming apparatus, without executing the processing (a), in response to the allotted connection request.

7. The image forming apparatus according to claim 5, wherein, in the network receipt processing and the non-network receipt processing, the controller is configured to operate the recording driver so that the recording device forms an image on a recording medium based on the connection request.

* * * * *